(12) United States Patent
Wu

(10) Patent No.: US 7,964,006 B2
(45) Date of Patent: Jun. 21, 2011

(54) BAG TYPE FILTER STRUCTURE

(75) Inventor: Jung-Seng Wu, Taipei (TW)

(73) Assignee: Peng-Chun Wu, Hsinchu (TW)

( * ) Notice: Subject to any disclaimer, the term of this patent is extended or adjusted under 35 U.S.C. 154(b) by 303 days.

(21) Appl. No.: 12/206,506

(22) Filed: Sep. 8, 2008

(65) Prior Publication Data

US 2010/0058721 A1   Mar. 11, 2010

(51) Int. Cl.
    *B01D 46/00* (2006.01)
(52) U.S. Cl. .......... 55/378; 55/483; 55/484; 55/DIG. 12
(58) Field of Classification Search .............. 55/378, 55/483, 484, 499, 493, 497, 511, 500, 514, 55/521, DIG. 12, DIG. 31; 210/493.1, 493.5
    See application file for complete search history.

(56) References Cited

U.S. PATENT DOCUMENTS

| | | | |
|---|---|---|---|
| 3,422,602 A * | 1/1969 | Janson | 55/378 |
| 3,505,795 A * | 4/1970 | Wurtenberg | 55/499 |
| 4,356,011 A * | 10/1982 | Day et al. | 55/368 |
| 4,925,561 A * | 5/1990 | Ishii et al. | 210/493.3 |
| 5,298,044 A * | 3/1994 | Sutton et al. | 55/378 |
| 5,554,203 A * | 9/1996 | Borkent et al. | 55/378 |

* cited by examiner

*Primary Examiner* — Duane Smith
*Assistant Examiner* — Minh-Chau Pham
(74) *Attorney, Agent, or Firm* — Roger H. Chu

(57) ABSTRACT

The present invention discloses a bag type filter structure including a filter frame module and filter bags. The filter frame module has a frame edge at each side of the perimeter of the filter frame module, and connecting ribs between two opposite frame edges for partitioning the filter frame module into air inlets. The quantity of filter bags is equal to the quantity of air inlets. Each filter bag includes a bag body and a frame, and the bag body has a mouth, and the frame is a grid frame composed of connecting members and a side frame and connected to the mouth of the bag body for bracing the mouth, and the side frame of the frame is embedded into the air inlet of the filter frame module for mounting the filter bag onto the filter frame module through the frame.

8 Claims, 3 Drawing Sheets

BAG TYPE FILTER STRUCTURE

FIELD OF THE INVENTION

The present invention relates to a bag type filter structure, and more particularly to a filter structure applied in air-conditioning equipments.

BACKGROUND OF THE INVENTION

As science and technology advance, air-conditioning systems are used extensively in many areas. To effectively control various environmental factors in a close space such as an indoor space, a clean room, a central air-conditioning control room, a basement, a subway system, an air-conditioning system is required. In addition to a compressor for providing motive power, the air-conditioning system also comes with an air filter system.

The function of filtering dusts, impurities and foreign matters in air is one of the basic requirements of the air-conditioning system, and the requirements of the air filtering function become increasingly higher in the development of high-tech industries, and the specification of air filters also becomes increasingly stricter.

The filter frame and the filter of the conventional air filter equipment are integrally formed, and thus providing an easy replacement or maintenance, but incurring a high cost and an environmental protection issue. As a result, many improvements on the air filter assembly were made in the past, and some of the improved assemblies are disclosed in Republic of China (Taiwan/R.O.C.) Patent No. M258796 entitled "Filter frame module structure" and R.O.C. Patent No. M258975 entitled "Air-conditioner filter bag structure", and these issued patents primarily provide a modularized filter bag coupled to a filter frame module to facilitate the installation and removal of the filter and overcome the shortcomings of the prior art including the poor environmental protection of the integrally formed filter and the high cost. However, the filtering efficiency and performance of such modularized assembly of filter bag and filter frame require further improvements.

Therefore, the inventor of the present invention developed a bag type filter structure in accordance with the invention to improve the filtering performance and the economic efficiency while maintaining the advantages of the modularized assembly of the filter bag and the filter frame.

BRIEF SUMMARY OF THE INVENTION

It is a primary objective of the present invention to overcome the shortcomings of the prior art by providing a bag type filter structure, particularly a filter structure applied in an air-conditioning system.

To achieve the foregoing objective, the present invention provides a bag type filter structure comprising a filter frame module and a plurality of filter bags. The filter frame module is made of a stainless metal, and a frame is disposed at each side of the perimeter of the filter frame module, wherein a plurality of connecting ribs are disposed between two opposite frame edges for partitioning the filter frame module into a plurality of air inlets, and the air inlet can be in a rectangular, circular, triangular, rhombic or honeycomb shape or any other geometric shape. The quantity of filter bags is equal to the quantity of air inlets, and the filter bag further includes a bag body having a mouth and a frame. The bag body is made of unwoven cloth, glass fiber or synthetic fiber, and the bag body further includes a pad portion sewed onto an inner side of bag body.

The frame is connected to the mouth of the bag body for bracing the mouth, and the side frame of the frame is embedded into the air inlet of the filter frame module, such that the filter bag can be mounted onto the filter frame module through the frame.

The frame can be a grid frame composed of a plurality of connecting members and a side frame or the shape of the frame has the same shape of the air inlet, and the frame is made of paper, plastic or metal.

The advantages and technical characteristics of the present invention will become apparent with the following detailed description of preferred embodiments accompanied with the related drawings. It is noteworthy to point out that the drawings are provided for reference and illustration only, but not intended to limit the scope of the present invention.

DETAILED DESCRIPTION

Figure 1:
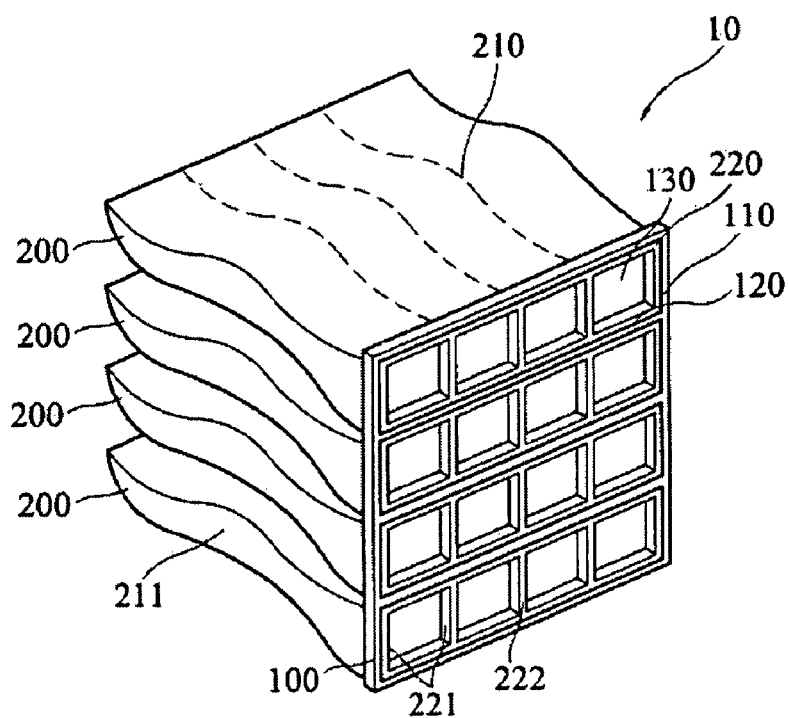
FIG. 1 is a perspective view of a bag type filter structure in accordance with a first preferred embodiment of the present invention.
Figure 2:
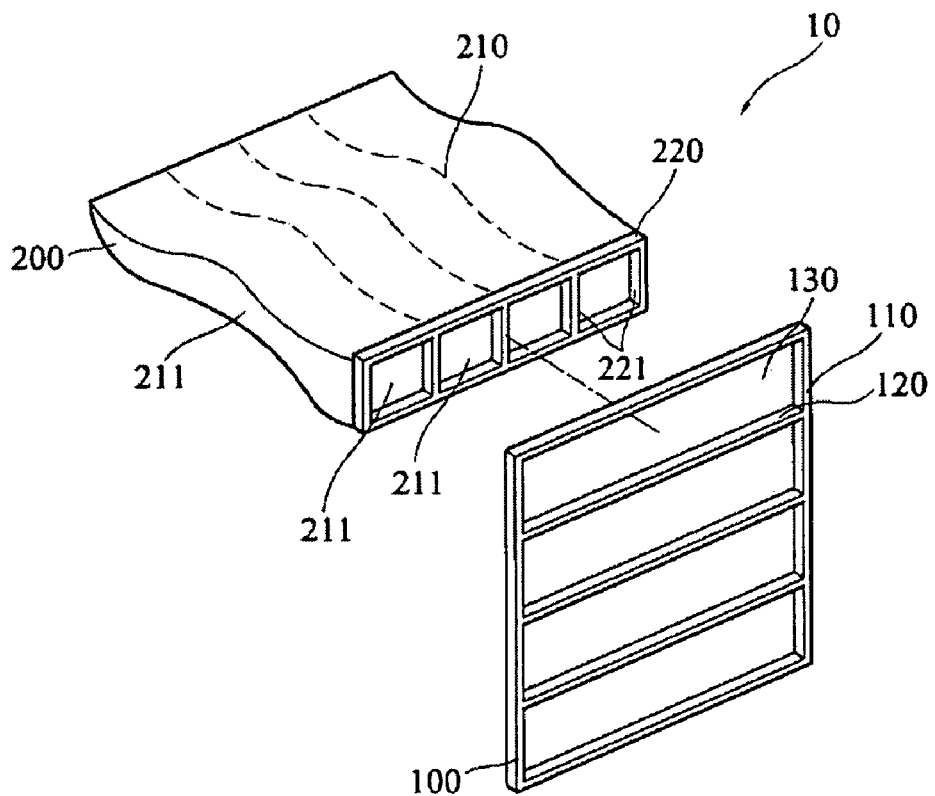
FIG. 2 is an exploded view of a bag type filter structure in accordance with a first preferred embodiment of the present invention.
Figure 3:
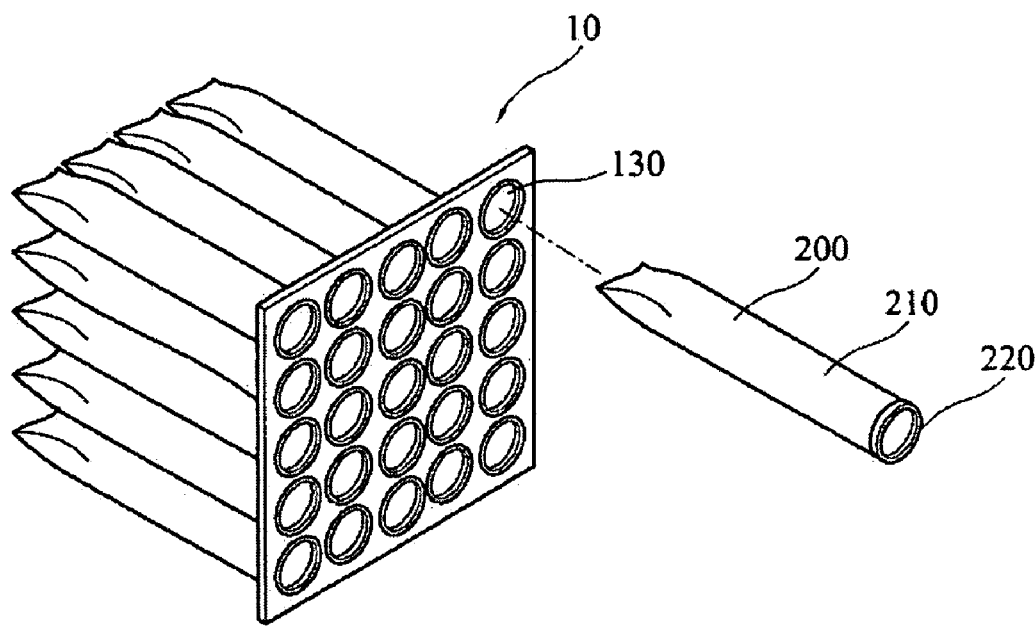
FIG. 3 is a perspective view of a bag type filter structure in accordance with a second preferred embodiment of the present invention.
Figure 4:
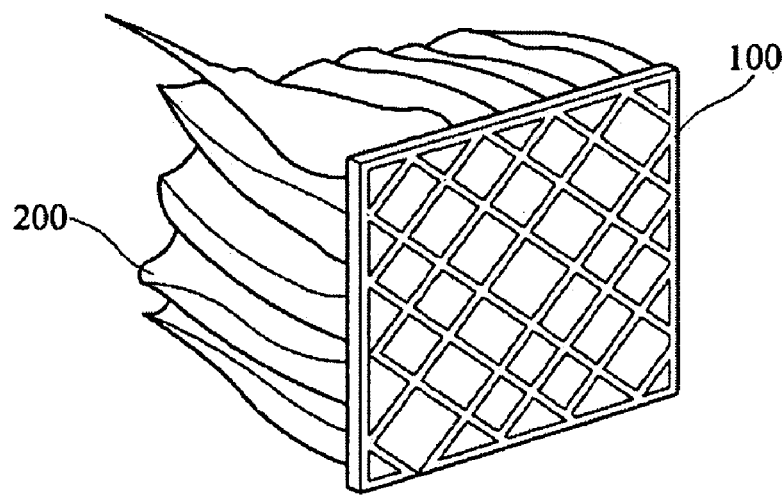
FIG. 4 is a perspective view of a bag type filter structure in accordance with a third preferred embodiment of the present invention.
Figure 5:
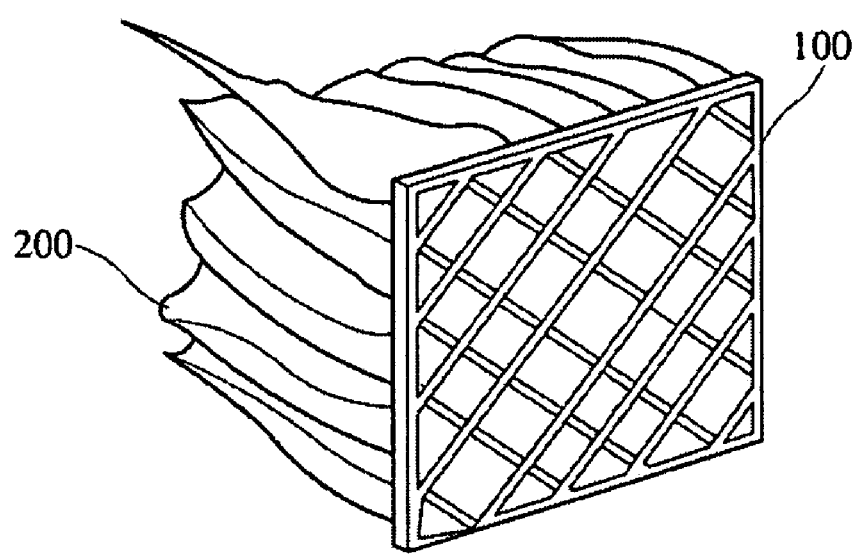
FIG. 5 is a perspective view of a bag type filter structure in accordance with a fourth preferred embodiment of the present invention.
Figure 6:
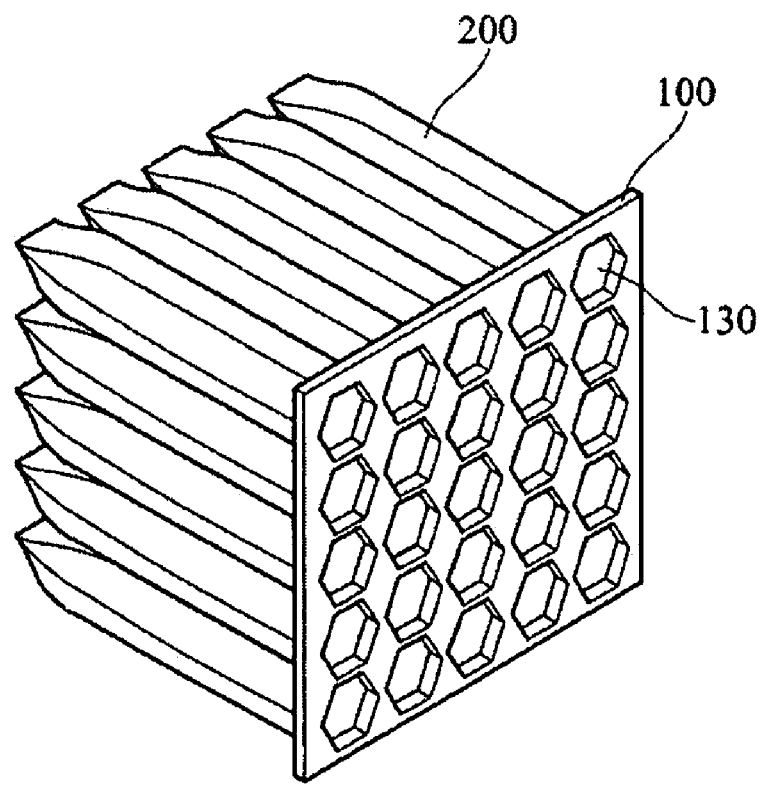
FIG. 6 is a perspective view of a bag type filter structure in accordance with a fifth preferred embodiment of the present invention.

With reference to FIGS. 1 and 2 for a perspective view and an exploded view of a bag type filter structure in accordance with a first preferred embodiment of the present invention respectively, the bag type filter structure 10 comprises a filter frame module 100 and a plurality of filter bags 200 coupled to the filter frame module 100. The filter frame module 100 includes a frame edge 110 disposed on each side of the perimeter of the filter frame module 100, and two opposite frame edges are connected to a plurality of connecting ribs 120, such that the filter frame module is partitioned into a plurality of air inlets 130. The frame edge 110 and the connecting rib 120 of the filter frame module 100 are integrally formed and made of a stainless metal.

In FIGS. 1 and 2, the quantity of filter bags 200 is equal to the quantity of air inlets 130 in order to cover the whole filter frame module 100. The filter bag 200 includes a bag body 210 having a mouth and a frame 220. The bag body 210 is generally made of unwoven cloth, glass fiber or synthetic fiber, and further includes a pad portion 211 sewed onto an inner side of the bag body 210.

The frame 220 is a grid frame composed of a side frame 221 and a plurality of connecting members 222. The shape and size of the side frame 221 are the same as those of the air inlet 130 of the filter frame module 100, such that the frame 220 can be embedded into the air inlet 130. The frame 220 is integrally formed and made of paper, plastic or metal.

The frame 220 is connected to the mouth of the bag body 210 through the side frame 221, such that the mouth of the bag body 210 can be braced, and the shape of the mouth can be limited and defined. In the figures, the frame 220 is embedded into the air inlet 130 of the filter frame module 100, such that the filter bag 200 can be mounted onto filter frame module 100 to produce a bag type filter structure 10.

The principle of fluid dynamics is adopted in the invention. Air flows through the bag type filter structure 10. With the effect of the plurality of connecting members 222 of the frame 220 of the filter bag 200, both of the speed of airflow and the contact area between the air and the pad portion 211 of the bag body 210 of the filter bag 200 can be increased to enhance the filtering efficiency of the bag type filter structure 10. The filter bag 200 is embedded into the air inlet 130 of the filter frame module 100 through the frame 220, so that each filter bag 200 can be replaced or cleaned separately at appropriate time depending on the filtering effect and the level of contamination or damage, so as to save the cost and improve the economic benefits for users.

In addition to the aforementioned embodiment, other embodiments are provided for illustrating the present invention. With reference to FIGS. 3 to 6 for the perspective views of a bag type filter structure in accordance with the second to the fifth preferred embodiments of the present invention respectively, the shape of the air inlet 130 of the filter frame module 100 can be integrally formed into a circular, triangular, rhombic and honeycomb shape, etc. The filter bag 200 can be embedded into another filter frame module 100 of a different shape. The side frame 221 and the connecting member 222 of the frame 220 must be in compliance with each other to form a different shape. The filter bag 200 can be formed independently or combined with the air inlet 130 of the filter frame module 100, and thus the filter frame module of the invention is not limited to the rectangular shape of the conventional filter frame module.

In summation of the above description, the present invention herein enhances the performance than the conventional structure and further complies with the patent application requirements and thus is duly filed for patent applications. While the invention has been described by means of specific embodiments, numerous modifications and variations could be made thereto by those skilled in the art without departing from the scope and spirit of the invention set forth in the claims.

What is claimed is:

1. A bag filter structure, comprising:
   a filter module, made of a stainless metal, and having a frame edge disposed at each side of the perimeter of the filter frame module, a plurality of connecting ribs disposed between two opposite frame edges for partitioning the filter frame module into a plurality of air inlets; and
   a plurality of filter bags, with a quantity equal to the quantity of air inlets, and the filter bag further comprising:
      a bag body, having a mouth; and
      a frame, being a grid frame composed of a plurality of connecting members and a side frame, and couple to the mouth of the bag body for bracing the mouth, and the side frame of the frame being embedded into the air inlets of the filter frame module for mounting the filter bag onto the filter frame module through the frame.

2. The bag type filter structure of claim 1, wherein the bag body of the filter bag is made of a material selected from the collection of unwoven cloth, glass fiber and synthetic fiber.

3. The bag type filter structure of claim 1, wherein the bag body of the filter bag further comprises a pad portion sewed onto an inner side of the bag body.

4. The bag type filter structure of claim 1, wherein the frame of the filter bag is made of a material selected from the collection of paper, plastic and metal.

5. A bag filter structure, comprising:
   a filter module, made of a stainless metal, and having a frame edge disposed at each side of the perimeter of the filter frame module, a plurality of connecting ribs disposed between two opposite frame edges for partitioning the filter frame module into a plurality of air inlets; and
   a plurality of filter bags, with a quantity equal to the quantity of air inlets, and the filter bag further comprising:
      a bag body, having a mouth; and
      a frame, couple to the mouth of the bag body for bracing the mouth, and embedded into the air inlets of the filter frame module for mounting the filter bag onto the filter frame module through the frame.

6. he bag type filter structure of claim 5, wherein the bag body of the filter bag is made of a material selected from the collection of unwoven cloth, glass fiber and synthetic fiber.

7. he bag type filter structure of claim 5, wherein the bag body of the filter bag further comprises a pad portion sewed onto an inner side of the bag body.

8. he bag type filter structure of claim 5, wherein the frame of the filter bag is made of a material selected from the collection of paper, plastic and metal.

* * * * *